United States Patent
Lee et al.

(10) Patent No.: US 10,324,495 B2
(45) Date of Patent: Jun. 18, 2019

(54) BASE OF TABLET COMPUTER

(71) Applicant: Quanta Computer Inc., Taoyuan (TW)

(72) Inventors: Jui-Yuan Lee, Taoyuan (TW); I-Hao Chen, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 121 days.

(21) Appl. No.: 15/676,190

(22) Filed: Aug. 14, 2017

(65) Prior Publication Data

US 2018/0364756 A1     Dec. 20, 2018

(30) Foreign Application Priority Data

Jun. 14, 2017    (TW) .............................. 106208606 U

(51) Int. Cl.
*G06F 1/16*        (2006.01)
*G06F 13/14*      (2006.01)
*G06F 3/023*      (2006.01)

(52) U.S. Cl.
CPC .......... *G06F 1/1632* (2013.01); *G06F 1/1607* (2013.01); *G06F 3/023* (2013.01); *G06F 13/14* (2013.01)

(58) Field of Classification Search
CPC .... G06F 1/1632; G06F 1/1626; G06F 1/1607; G06F 1/1656
USPC ...................................... 361/679.41; 710/303
See application file for complete search history.

(56) References Cited

U.S. PATENT DOCUMENTS

| | | | | |
|---|---|---|---|---|
| 5,864,294 A * | 1/1999 | Hsu | ...................... | G06F 1/1632 340/635 |
| 9,420,085 B2 * | 8/2016 | Izutsu | ................... | G06F 3/1438 |
| 9,429,994 B1 * | 8/2016 | Vier | ....................... | G06F 1/1656 |
| 9,740,240 B1 * | 8/2017 | Matsumoto | ........... | G06F 1/1632 |
| 2011/0164375 A1 * | 7/2011 | Hayashida | ............ | G06F 1/1632 361/679.41 |
| 2011/0278885 A1 * | 11/2011 | Procter | ............... | B60R 11/0235 297/135 |
| 2012/0229974 A1 * | 9/2012 | Ting | ...................... | G06F 1/1626 361/679.56 |
| 2012/0293949 A1 * | 11/2012 | Zhou | ...................... | H01R 27/00 361/679.41 |
| 2013/0050933 A1 * | 2/2013 | Prest | ...................... | H01R 13/44 361/679.41 |
| 2013/0058036 A1 * | 3/2013 | Holzer | ................. | G06F 1/1632 361/679.44 |
| 2014/0073178 A1 * | 3/2014 | Webb | .................... | G06F 1/1632 439/533 |

(Continued)

*Primary Examiner* — Faisal M Zaman

(57) ABSTRACT

A base of tablet computer includes a housing, a moving member, and an interface assembly. The housing has a trench, a first sidewall, and a second sidewall connected to the first sidewall. The first sidewall forms a portion of the trench and has a first opening. The second sidewall forms another portion of the trench and has a second opening. The moving member is configured to move relative to the housing to selectively enter or exit the trench via the first opening. The interface assembly protrudes to a side of the second sidewall adjacent to the trench via the second opening, and is configured to rotate relative to the second opening based on an axis. The interface assembly is operatively connected to the moving member, so as to be rotated by the moving member while the moving member is moved relative to the housing.

11 Claims, 8 Drawing Sheets

(56) References Cited

U.S. PATENT DOCUMENTS

| | | | | |
|---|---|---|---|---|
| 2014/0118923 A1* | 5/2014 | Stanley | ................ | G06F 1/1626 |
| | | | | 361/679.41 |
| 2014/0223065 A1* | 8/2014 | Jolda | ...................... | G06F 13/36 |
| | | | | 710/303 |
| 2015/0137762 A1* | 5/2015 | Kim | ...................... | H02J 7/0044 |
| | | | | 320/115 |
| 2017/0153667 A1* | 6/2017 | Suckle | ................ | G06F 1/1632 |
| 2017/0208697 A1* | 7/2017 | Kurian | ................ | H02J 7/0044 |
| 2018/0152033 A1* | 5/2018 | Yu | ...................... | A47G 23/0216 |
| 2018/0229363 A1* | 8/2018 | Kurihara | ................ | B25J 9/1674 |
| 2018/0364756 A1* | 12/2018 | Lee | ...................... | G06F 1/1632 |

* cited by examiner

BASE OF TABLET COMPUTER

CROSS-REFERENCE TO RELATED APPLICATION

This application claims priority to Taiwan Application Serial Number 106208606, filed Jun. 14, 2017, which is herein incorporated by reference.

BACKGROUND

Field of Invention

The present invention relates to a base of tablet computer.

Description of Related Art

In recent years, the tablet computer industry is in rapid development, and has introduced portable, lightweight, and different sizes of tablet computers. In addition, if a user constantly grasps the tablet computer with their hand, it is easy for the user's hands become tired. Furthermore, because size of the tablet computers are not uniform, how to develop a variety of sizes and flexible adjustments for a base for tablet computers is a problem faced by the persons having ordinary skill in the art.

SUMMARY

The present disclosure provides a base of tablet computer. The base of tablet computer includes a housing, a moving member, and an interface assembly. The housing has a trench, a first sidewall, and a second sidewall connected to the first sidewall. The first sidewall forms a portion of the trench and has a first opening. The second sidewall forms another portion of the trench and has a second opening. The moving member is configured to move relative to the housing to selectively enter or exit the trench via the first opening. The interface assembly protrudes to a side of the second sidewall adjacent to the trench via the second opening, and is configured to rotate relative to the second opening based on an axis. The interface assembly is operatively connected to the moving member, so as to be rotate by the moving member while the moving member is moved relative to the housing.

In some embodiments of the present disclosure, the trench has a bottom surface. The moving member has a first abutting surface facing to the trench. The first sidewall has a second abutting surface. The bottom surface of the trench and the first abutting surface of the moving member form a first angle therebetween. The bottom surface of the trench and the second sidewall form a second angle therebetween. The first angle is larger than the second angle.

In some embodiments of the present disclosure, the second angle formed by the bottom surface of the trench and the second sidewall is an obtuse angle.

In some embodiments of the present disclosure, the housing has at least one first sliding chute. The moving member has at least one slider. The slider is slidably engaged in the first sliding chute.

In some embodiments of the present disclosure, the base of tablet computer further includes a connecting rod pivotally connected between the interface assembly and the moving member. The interface assembly is rotated by the moving member via the connecting rod while the moving member is moved relative to the housing.

In some embodiments of the present disclosure, the moving member has a first pivotal shaft. The interface assembly has a second pivotal shaft. The connecting rod pivotally connects between the first pivotal shaft of the moving member and the second pivotal shaft of the interface assembly. The first pivotal shaft of the moving member and the axis define a moving plane. The second pivotal shaft of the interface assembly is located at a side of the moving plane adjacent to the trench.

In some embodiments of the present disclosure, the interface assembly includes a pivoting plate having at least one second sliding chute, the housing includes at least one protruding portion, and the protruding portion is disposed on a side of the second sidewall facing away the trench, wherein the second sliding chute engages the protruding portion and is movably limited by the protruding portion.

In some embodiments of the present disclosure, the interface assembly includes a tablet computer connector protruding to the side of the second sidewall adjacent to the trench via the second opening.

In some embodiments of the present disclosure, the housing further includes a third sidewall connecting to the second sidewall, opposite to the first sidewall, and having a third abutting surface. The third sidewall forms another portion of the trench and forms a third angle with the bottom surface. The third angle is an acute angle.

In some embodiments of the present disclosure, the base of tablet computer further includes at least one elastic element connected between the housing and the moving member.

In the aforementioned configurations, the base of tablet computer of the present disclosure can change a tilt angle of the tablet computer connector disposed thereon according to different tablet computers with different thicknesses. Hence, when a tablet computer with a different thickness is set on the base, the tablet computer connector of the base can be connected to tablet computers with different thicknesses.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
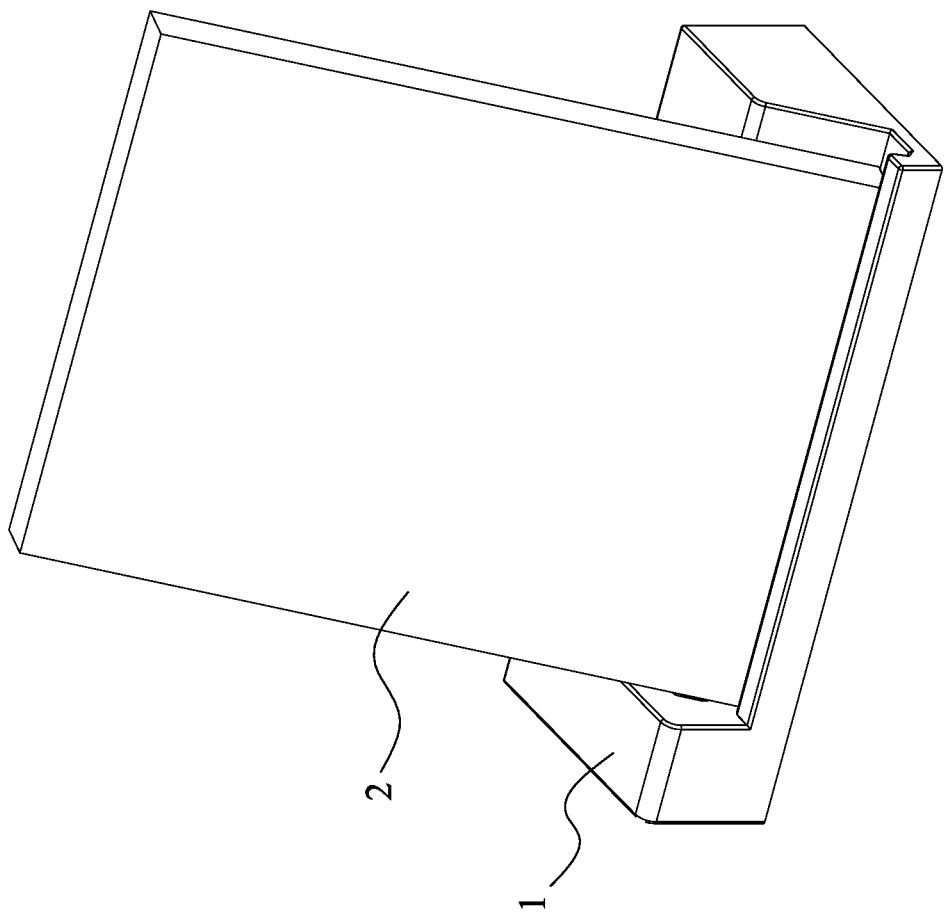
FIG. 1 is a perspective view of a tablet computer disposed on a base in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
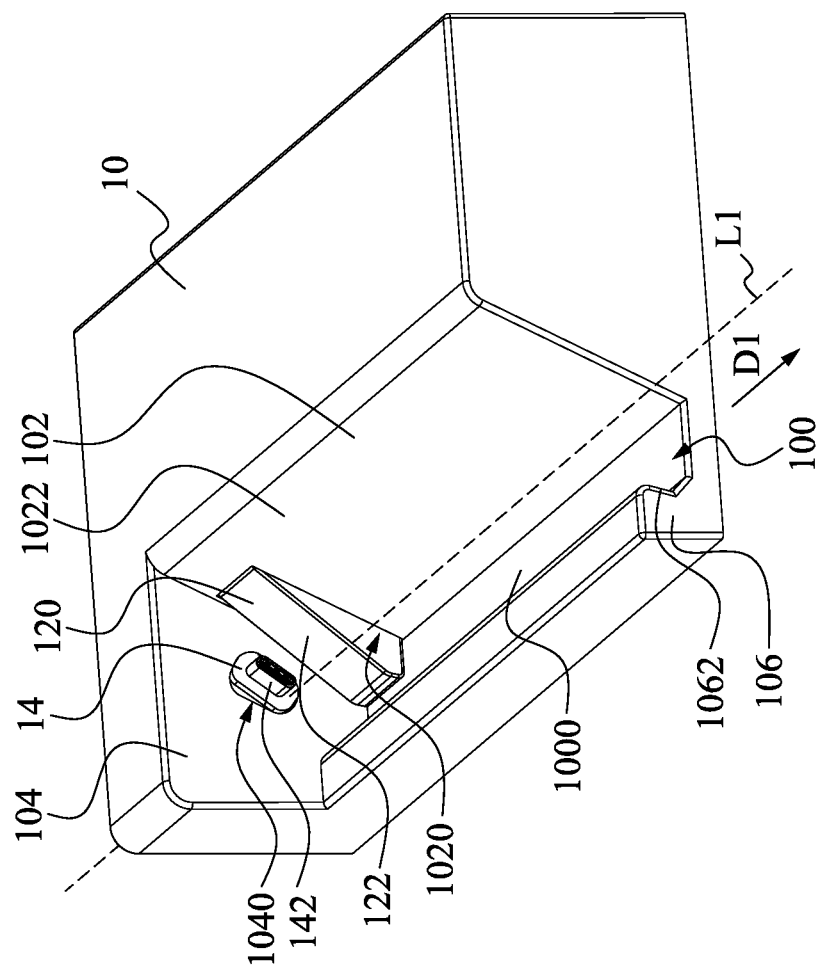
FIG. 2 is a perspective view of the base of tablet computer in accordance with some embodiments of the present disclosure.
Figure 3:
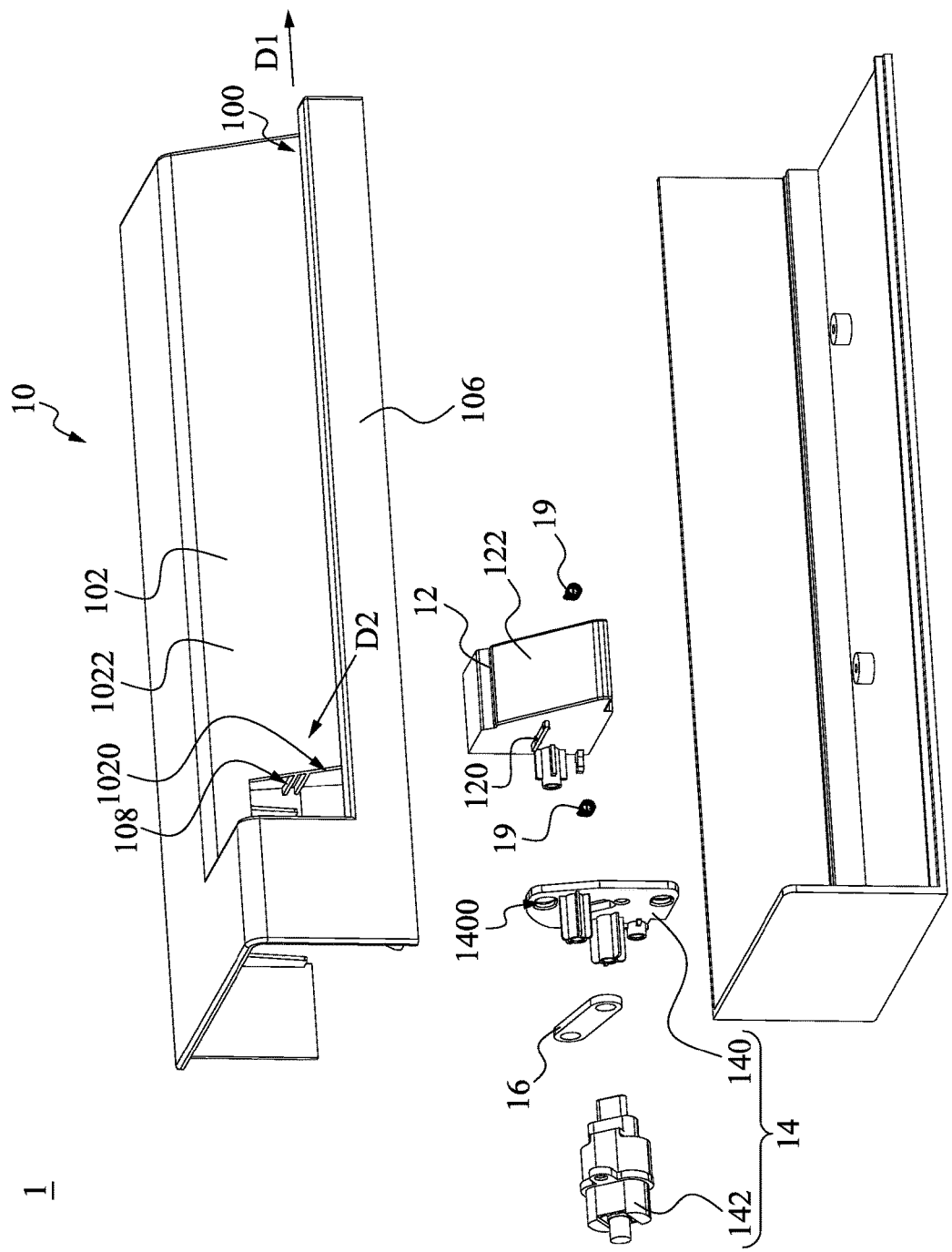
FIG. 3 is an explosive view of the base of tablet computer in accordance with some embodiments of the present disclosure.

Reference is made to FIGS. 1, 2, and 3. FIG. 1 is a perspective view of a tablet computer 2 disposed on a base 1 in accordance with some embodiments of the present disclosure. FIGS. 2 and 3 are perspective view and explosive view respectively of the base 1 of tablet computer in accordance with some embodiments of the present disclosure. However, the base 1 of tablet computer is not limited to an application to a tablet computer. In other embodiments, any suitable electronic device can be applied to the present disclosure. As shown in FIGS. 2 and 3, in the embodiments, the base 1 of the tablet computer includes a housing 10, a moving member 12, an interface assembly 14, a connecting rod 16 (see FIG. 3), and an elastic element 19 (see FIG. 3). The structure and function of the components and their relationships are described in detail hereinafter.

Figure 5A:
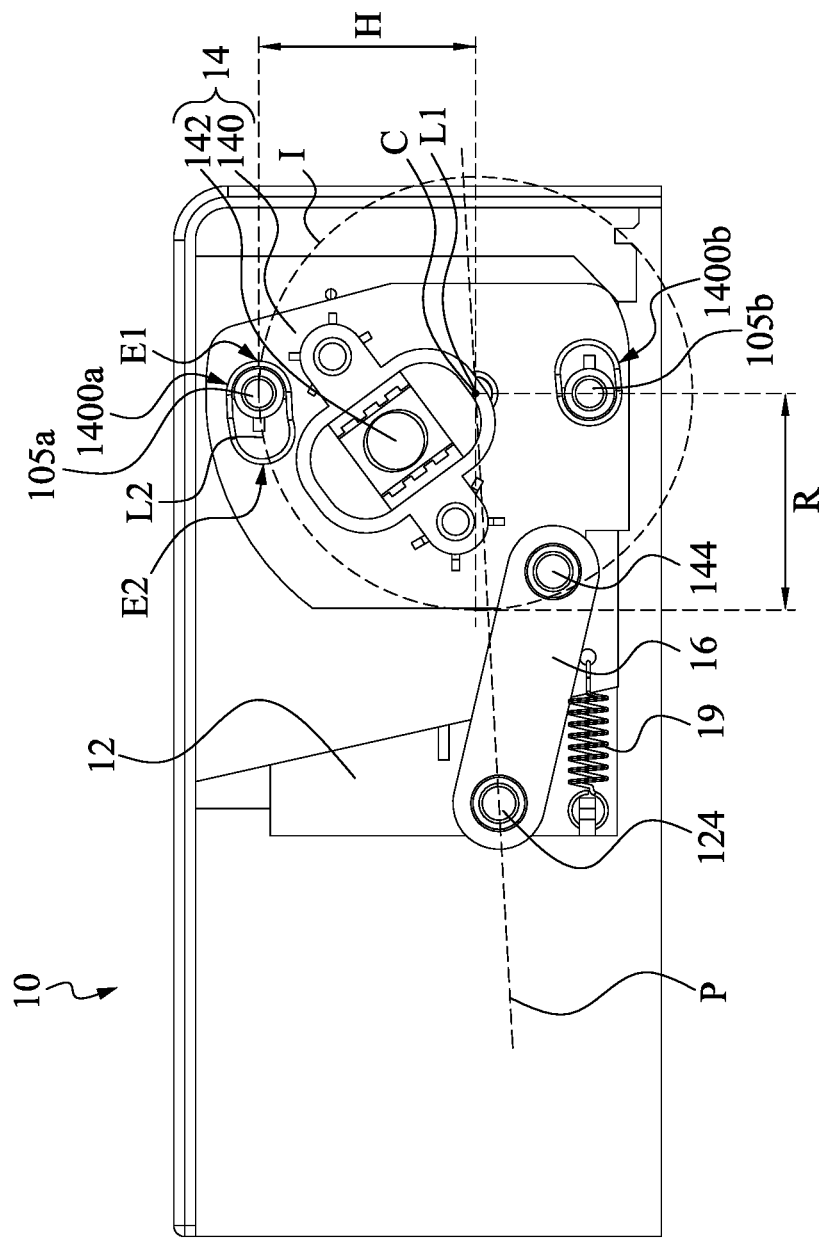
FIGS. 5A and 5B are side views of partial structures of the base of tablet computer under different actions in accordance with some embodiments of the present disclosure, in which the difference between FIG. 5B and that in FIG. 5A is in that a tablet computer (not shown) is disposed on the base shown in FIG. 5B.
Figure 5B:
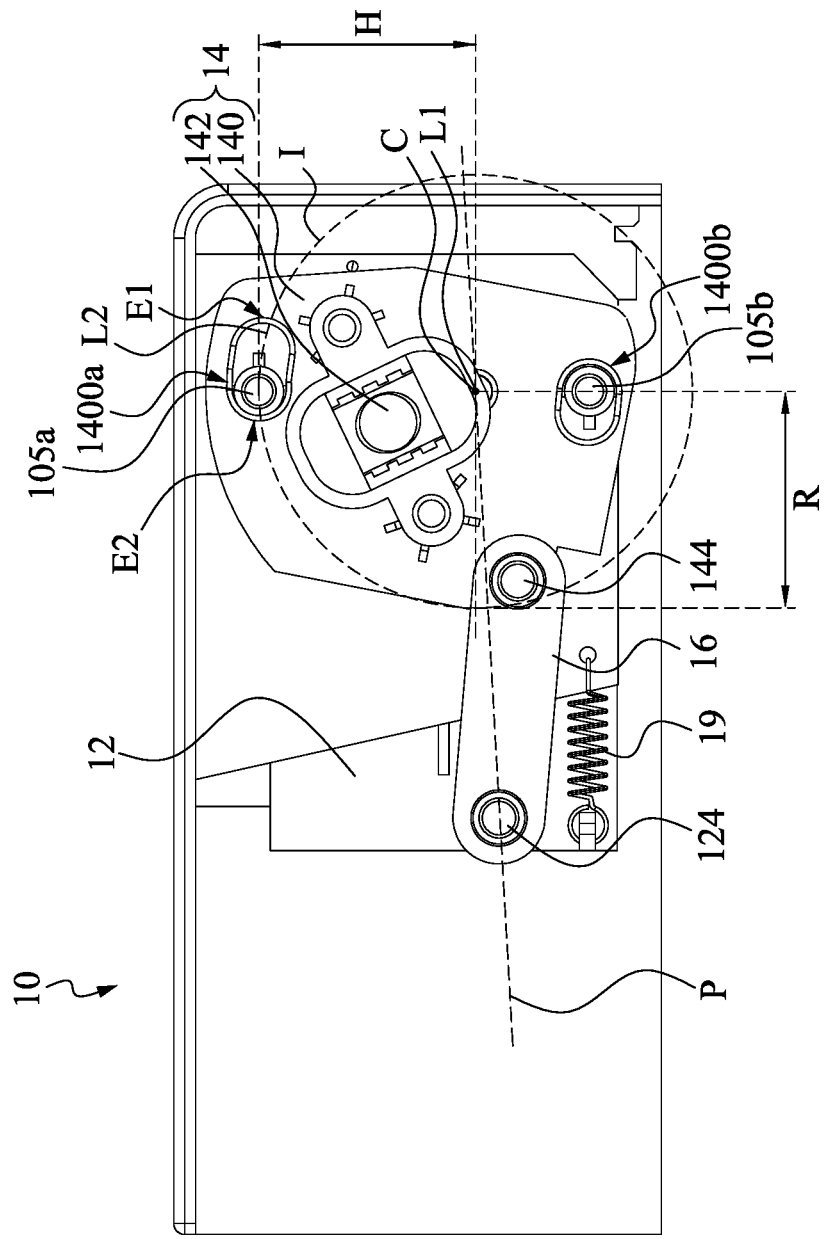

In FIGS. 2 and 3, the housing 10 has a trench 100, first, second, and third sidewalls 102, 104, and 106, at least one first sliding chute 108 (see FIG. 3, only one is depicted), and a protruding portion 105a (see FIGS. 5A and 5B). The trench 100 of the housing 10 has a bottom surface 1000 extending along a direction D1. The first sidewall 102 of the housing 10 has a second abutting surface 1022 and connects to the second sidewall 104. The first sidewall 102 of the housing 10 forms a portion of the trench 100 and has a first opening 1020. The second sidewall 104 of the housing 10 forms a portion of the trench 100 and has a second opening 1040. The third sidewall 106 connects to the second sidewall 104, is disposed opposite to the first sidewall 102, has a third abutting surface 1062, and forms a portion of the trench 100. The first sliding chute 108 (see FIG. 3) connects adjacent to the first opening 1020 of the first sidewall 102 and extends along a direction D2 toward the housing 10. In the embodiment, the direction D2 is substantially perpendicular to the direction D1, but the present disclosure is not limited thereto. In other embodiments, any direction intersecting the direction D1 may be applied to the present disclosure as the direction D2.

Figure 4B:
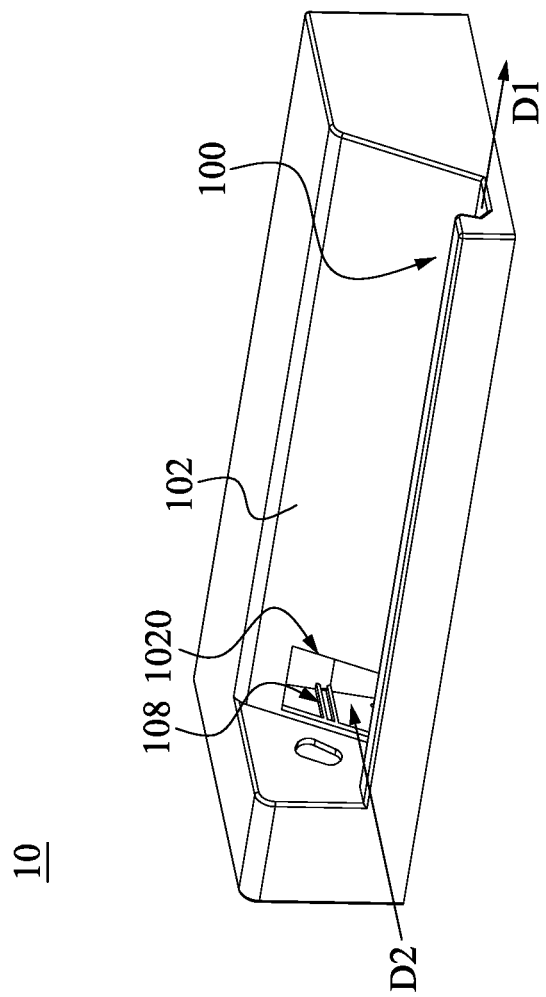
FIGS. 4A and 4B are perspective views of a moving member and a housing respectively in accordance with some embodiments of the present disclosure.
Figure 4A:
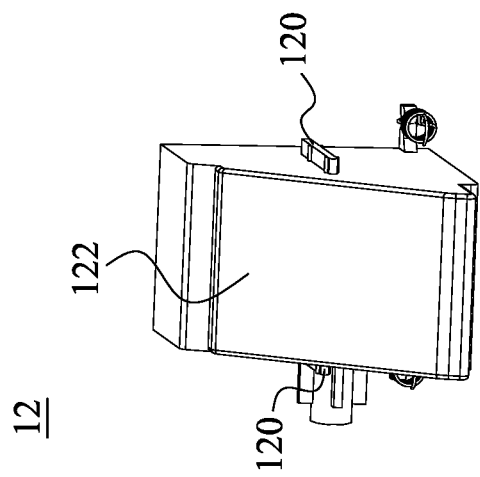

Reference is made to FIGS. 4A and 4B. FIG. 4A is perspective view of the moving member 12 in accordance with some embodiments of the present disclosure. FIG. 4B is perspective view of the housing 10 in accordance with some embodiments of the present disclosure. As shown in FIGS. 4A and 4B, in the embodiment, the moving member 12 has a first abutting surface 122 and has at least one slider 120 (two are depicted). The first abutting surface 122 of the moving member 12 facing the trench 100 of the housing 10, and the slider 120 is slidably engaged in the first sliding chute 108 of the housing 10, thereby enabling the moving member 12 to be configured to move relative to the housing 10 to selectively enter or exit the trench 100 of the housing 10 via the first opening 1020 of the first sidewall 102 along a direction perpendicular to the direction D1.

Reference is made to FIGS. 2, 5A and 5B. FIGS. 5A and 5B are side views of partial structures of the base 1 of tablet computer under different actions in accordance with some embodiments of the present disclosure, in which the difference between FIG. 5B and that in FIG. 5A is in that a tablet computer (not shown) is disposed on the base 1 in FIG. 5B.

As shown in FIGS. 5A and 5B, in the embodiment, the interface assembly 14 of the base 1 of the tablet computer includes a tablet computer connector 142 and a pivoting plate 140. The tablet computer connector 142 of the interface assembly 14 is fixed to the pivoting plate 140, protrudes to a side of the second sidewall 104 (see FIG. 2) adjacent to the trench 100 via the second opening 1040 of the second sidewall 104, and is configured to rotate relative to the second opening 1040 of the second sidewall 104 based on an axis L1 (see FIG. 2). The axis L1 of the present disclosure passes through the second sidewall 104 of the housing 10 and substantially parallel to the direction D1 which the trench 100 extends along with.

In FIGS. 5A and 5B, the pivoting plate 140 of the interface assembly 14 has a second sliding chute 1400a and a second pivotal shaft 144. For example, the second sliding chute 1400a has a central axis L2, a first end E1, and a second end E2 opposite to the first end E1. The central axis L2 of the second sliding chute 1400a has a curvature radius R and a curvature center C. The curvature radius R of the central axis L2 is substantially equal to a distance H from the central axis L2 to the axis L1, and the curvature center C coincides with the axis L1. The axis L1 and the distance H form a circular track I. As such, when the pivoting plate 140 of the interface assembly 14 is rotated relative to the second sidewall 104 based on the axis L1, the central axis L2 of the second sliding chute 1400a will fall on the circular track I.

Furthermore, the protruding portion 105a is disposed on a side of the second sidewall 104 away from the trench 100. The second sliding chute 1400a of the pivoting plate 140 pivots the protruding portion 105a of the housing 10. For example, a distance from an axis of the protruding portion 105a to the axis L1 is substantially equal to the distance H from the central axis L2 of the second sliding chute 1400a to the axis L1. When the pivoting plate 140 of the interface assembly 14 is rotated relative to the second sidewall 104 based on the axis L1, the pivoting plate 140 is movably limited by the protruding portion 105a of the housing 10.

Specifically, when the protruding portion 105a of the housing 10 contacts the first end E1 of the second sliding chute 1400a, a positional relationship between the structures in the base 1 is designed as a tablet computer is not provided in the trench 100 of the base 1 (see FIG. 1). When second sliding chute 1400a of the pivoting plate 140 is rotated in a direction away from the moving member 12 based on the axis L1, the first end E1 of the second sliding chute 1400a is gradually moved away from the protruding portion 105a of the housing 10, and the second end E2 of the second sliding chute 1400a gradually approaches the protruding portion 105a at the same time. When the second end E2 of the second sliding chute 1400a is in contact with the protruding portion 105a of the housing 10, the second end E2 of the second sliding chute 1400a is limited by the protruding portion 105a and cannot continue to move away from the moving member 12. In other words, a radian between the first end E1 and the second end E2 of the second sliding chute 1400a forming on the circular track I defines an angle range in which the pivoting plate 140 can be rotatable based on the axis L1 (that is, a range of rotatable angle of the pivoting plate 140 based on the axis L1 is controlled by the radian of the central axis L2 of the second sliding chute 1400a).

In the embodiment, the housing 10 further includes a protruding portion 105b, and the pivoting plate 140 of the interface assembly 14 further includes a second sliding chute 1400b. The protruding portion 105b of the housing 10 is disposed on a side of the second sidewall 104 facing away the trench 100. The second sliding chute 1400b of the pivoting plate 140 pivots the protruding portion 105b of the housing 10. In the embodiment, a curvature center of a central axis of the second sliding chute 1400b is substantially equal to the curvature center C of the second sliding chute 1400a, but a curvature radius of the central axis of the second sliding chute 1400b is shorter than the curvature radius R of the second sliding chute 1400a. However, the structure and function of the second sliding chute 1400b and the protruding portion 105b and their relationships between the second sliding chute 1400b and the protruding portion 105b are substantially the same as the second sliding chute 1400a and the protruding portion 105a, and the related detailed descriptions may refer to the foregoing paragraphs, and are not discussed again herein. Furthermore, in the embodiment, the number of the protruding portions of the housing 10 and the second sliding chutes of the pivoting plate 140 are not limited thereto, any suitable quantity can be applied to the present disclosure.

Reference is made to FIGS. 2, 5A, and 5B. The connecting rod 16 of the base 1 of tablet computer is pivotally connected between the interface assembly 14 and the moving member 12. Specifically, the moving member 12 has a first pivotal shaft 124, in which the first pivotal shaft 124 and the axis L1 define a moving plane P. An end of the connecting rod 16 is pivotally connected to the first pivotal shaft 124 of the moving member 12, and another end of the connecting rod 16 is pivotally connected to the second pivotal shaft 144 of the pivoting plate 140, and the second pivotal shaft 144 is located at a side of the moving plane P adjacent to the trench 100 (see FIG. 2).

As such, when the moving member 12 is moved away from the trench 100 (see FIG. 2), the moving member 12 is driven by the first pivotal shaft 124 to move the connecting rod 16 away from the trench 100. Simultaneously, because the second pivotal shaft 144 of the pivoting plate 140 is located the side of the moving plane P adjacent to the trench 100, the connecting rod 16 will drive the second pivotal shaft 144 to move away from the trench 100 and to rotate. In other words, the interface assembly 14 is operatively connected to the moving member 12 by the connecting rod 16, thereby enabling the interface assembly 14 to drive the moving member 12 to move and to rotate by the connecting rod 16 during a movement of the moving member 12 relative to the housing 10. Hence, the tablet computer connector 142 located at the interface assembly 14 is also rotated relative to the second opening 1040 of the second sidewall 104 (see FIG. 2) based on the axis L1.

In the embodiment, the elastic element 19 is connected between the housing 10 and the moving member 12. In FIG. 5, a tablet computer (not shown) is disposed on the base 1. The tablet computer pushes the moving member 12 by the first abutting surface 122 of the moving member 12. When the moving member 12 is moved away from the trench 100 (see FIG. 2) relative to the housing 10, the elastic element 19 is pulled and elongated. At this time, the elastic element 19 stores the elastic potential energy, and provides the force that the housing 10 and the moving member 12 will be moved relative to each other. When a tablet computer thinner than the tablet computer (not shown) of FIG. 5B is disposed in the trench 100 of the housing 10, at least a part of the elastic potential energy storing in the elastic element 19 of FIG. 5B will be released. Hence, the elastic element 19 will shorten, thereby pulling the housing and the moving member 12 simultaneously, such that the moving member 12 will move toward the trench 100 to cause the tablet computer connector 142 to rotate relative to the second opening 1040 of the second sidewall 104 (see FIG. 2).

Figure 6A:
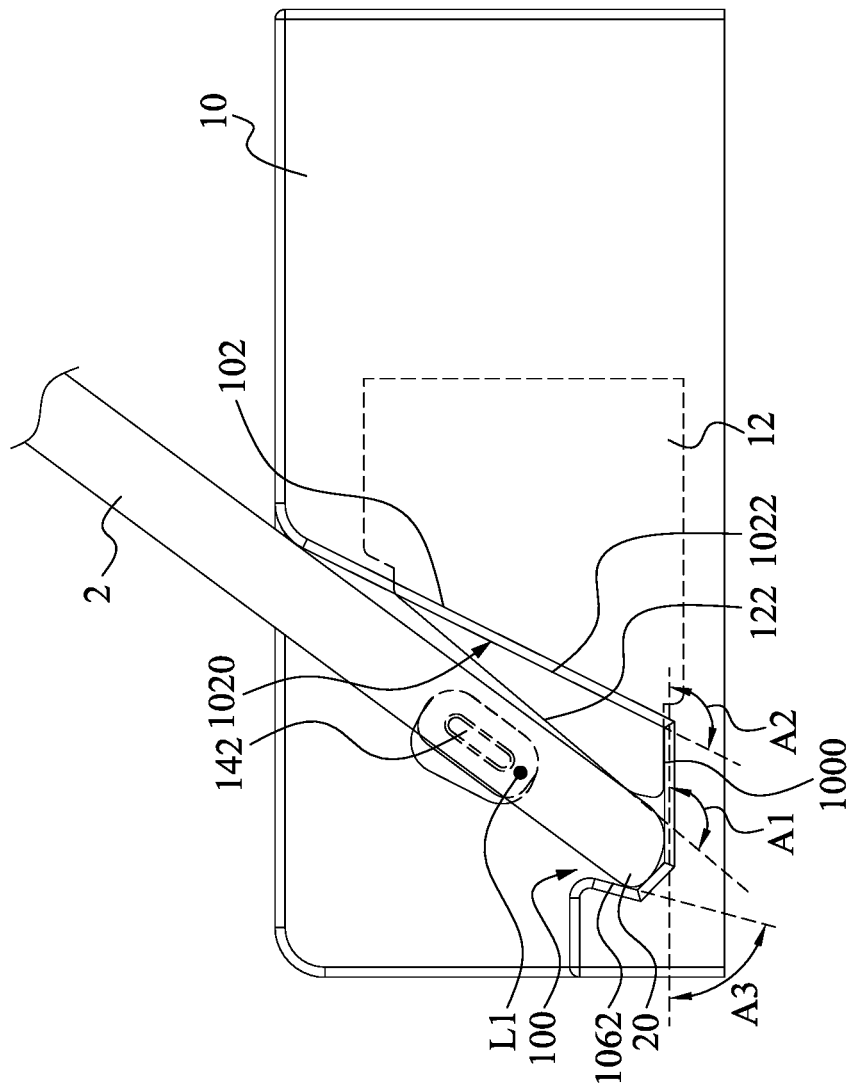
FIGS. 6A and 6B are side views of the base where tablet computers with different thicknesses are disposed thereon, in which the difference between FIG. 6B and that in FIG. 6A is in that the tablet computer in FIG. 6B is thicker than the tablet computer in FIG. 6A.
Figure 6B:
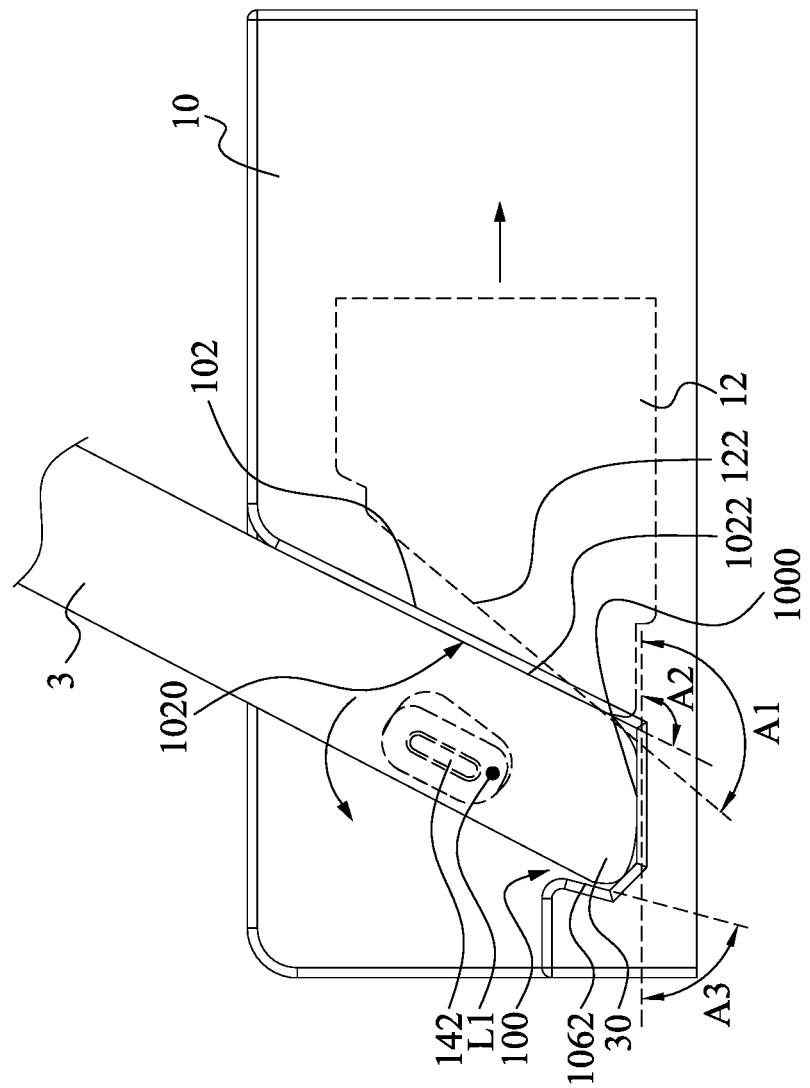

Reference is made to FIGS. 6A and 6B. FIGS. 6A and 6B are side views of the tablet computer 2 and a tablet computer 3 respectively with different thickness disposed on the base 1, in which the difference between FIG. 6B and that in FIG. 6A is in that the tablet computer 3 in FIG. 6B is thicker than the tablet computer 2 shown in FIG. 6A.

As shown in FIGS. 6A and 6B, in the embodiment, the tablet computer 2 and the tablet computer 3 has an abutting portion 20 and an abutting portion 30 respectively. The bottom surface 1000 of the trench 100 and a virtual extension surface of the first abutting surface 122 of the moving member 12 form a first angle A1 therebetween. The bottom surface 1000 of the trench 100 and a second abutting surface 1022 of the first sidewall 102 form a second angle A2 therebetween. The first angle A1 is larger than the second angle A2. In the embodiment, the second angle A2 is an obtuse. Furthermore, a virtual extension surface of the third abutting surface 1062 of the third sidewall 106 and the bottom surface 1000 of the trench 100 form a third angle A3 therebetween. In the embodiment, the third angle A3 is an acute angle.

As such, as shown in FIG. 6A, when the tablet computer 2 is disposed at the base 1, the tablet computer 2 is partially accommodated in the trench 100 of the housing, and the its rear abuts the first sidewall 102 of the housing 10. An angle between a virtual extension surface of the tablet computer 2 and a virtual extension surface of the bottom surface 1000 of the trench 100 is in a range between about the first angle A1 and about the second angle A2. Hence, the abutting portion 20 of the tablet computer 2 abuts the third abutting surface 1062, and is fixed between the third abutting surface 1062 and the bottom surface 1000 of the trench 100. In the aforementioned configuration with the interlocking relationship between the moving member 12, the connecting rod 16, and interface assembly 14, the interface of the tablet computer 2 can be connected to the tablet computer connector 142 of the base 1.

As shown in FIG. 6B, when the tablet computer 3 is disposed at the base 1, the abutting portion 30 of the tablet computer 3 abuts the third abutting surface 1062, and is fixed between the third abutting surface 1062 and the bottom surface 1000 of the trench 100. Specifically, the thickness of the tablet computer 3 of the present disclosure is larger than that of the tablet computer 2 shown in FIG. 6A. Hence, a port of the tablet computer 3 is moved a distance away from the first sidewall 102 of the housing 10 based on the axis L1 compared to a port of the tablet computer 2 disposed on the base 1. Moreover, an angle between a virtual extension surface of the rear of the tablet computer 3 and the virtual extension surface of the bottom surface 1000 of the trench 100 is larger than the angle between the tablet computer 2 and the bottom surface 1000 of the trench 100, and is smaller or substantially equal to the second angle A2.

Furthermore, because the thickness of the tablet computer 3 is larger than that of the tablet computer 2 shown in FIG. 6A, the tablet computer 3 will push the first abutting surface 122 of the moving member 12, so that the moving member 12 is moved relative to the housing 10 and exits the trench 100 of the housing 10 via the first opening 1020 of the first sidewall 102. When the moving member 12 is moved away from the trench 100, the moving member 12 drives the tablet computer connector 142 of the interface assembly 14 to rotate away from the moving member 12 (or the first sidewall 102 of housing 10 or the trench 100) based on the axis L1 by the connecting rod 16 (see FIGS. 5A and 5B). As such, the port of the tablet computer 3 can be connected to the tablet computer connector 142 of the base 1 of tablet computer.

As such, when tablet computer with different thickness is set on the base 1, any tablet computers with different thicknesses will have different slopes relative to the base 1, thereby enabling the port of the tablet computer with different thickness to change the tilt angle. The base 1 of tablet computer of the present disclosure can change a tilt angle of the tablet computer connector 142 disposed thereon according to different tablet computer with different thickness. Hence, when tablet computer with different thickness is set on the base 1, the tablet computer connector 142 of the base 1 can be connected to the tablet computer with different thickness. Furthermore, in other embodiments, the tablet computer connector 142 of the housing 10 can be replaces by a port, and a port of tablet computer can be replaced by a connector.

In the embodiment, when the moving member 12 moves away from the trench 100 relative to the housing 10, the elastic element 19 will become elongated. At this time, the elastic element 19 stores the elastic potential energy, and provides the force so that the housing 10 and the moving member 12 will be moved relative to each other. With the aforementioned force, the tablet computer 3 receives the thrust of the moving member 12, and is sandwiched between the moving member 12 and the third sidewall 106 to become fixed to the housing 10 of the base 1 of tablet computer.

According to the foregoing recitations of the embodiments of the disclosure, it can be seen that the base of tablet computer of the present disclosure can change a tilt angle of the tablet computer connector disposed thereon according to different tablet computer with different thickness. Hence, when tablet computers with different thicknesses are set on the base, the tablet computer connector of the base can be connected to any tablet computer that may have different thicknesses.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A base of tablet computer, comprising:
    a housing having, a first sidewall, a second sidewall connected to the first sidewall, and a third sidewall connected to the second sidewall and opposite to the first sidewall, wherein the first sidewall has a first opening that faces toward the third sidewall, the second sidewall has a second opening, and the first, second, and third sidewalls collectively define a trench;
    a moving member configured to move relative to the housing to selectively enter or exit the trench via the first opening of the first opening; and
    an interface assembly protruding to the trench via the second opening of the second sidewall, and being configured to rotate relative to the second opening based on an axis, wherein the interface assembly is operatively connected to the moving member, so as to be rotated by the moving member while the moving member is moved relative to the housing.

2. The base of tablet computer of claim 1, wherein the trench has a bottom surface, the moving member has a first abutting surface facing to the trench, the first sidewall has a second abutting surface, the bottom surface and the first abutting surface form a first angle therebetween, the bottom surface and the second sidewall form a second angle therebetween, and the first angle is larger than the second angle.

3. The base of tablet computer of claim 2, wherein the second angle is an obtuse angle.

4. The base of tablet computer of claim 1, wherein the housing has at least one first sliding chute, the moving member has at least one slider, and the slider is slidably engaged in the first sliding chute.

5. The base of tablet computer of claim 1, further comprising a connecting rod pivotally connected between the interface assembly and the moving member, wherein the interface assembly is rotated by the moving member via the connecting rod while the moving member is moved relative to the housing.

6. The base of tablet computer of claim 5, wherein the moving member has a first pivotal shaft, the interface assembly has a second pivotal shaft, the connecting rod pivotally connects between the first pivotal shaft and the second pivotal shaft, the first pivotal shaft and the axis define a moving plane, and the second pivotal shaft is located at a side of the moving plane adjacent to the trench.

7. The base of tablet computer of claim 1, wherein the interface assembly comprises a pivoting plate having at least one second sliding chute, the housing comprises at least one protruding portion, and the protruding portion is disposed on a side of the second sidewall facing away the trench, wherein the second sliding chute engages the protruding portion and is movably limited by the protruding portion.

8. The base of tablet computer of claim 1, wherein the interface assembly comprises a tablet computer connector protruding to the side of the second sidewall adjacent to the trench via the second opening.

9. The base of tablet computer of claim 2, wherein the third sidewall forms a third angle with the bottom surface, and the third angle is an acute angle.

10. The base of tablet computer of claim 1, further comprising at least one elastic element connected between the housing and the moving member.

11. The base of tablet computer of claim 1, wherein the axis passes through the second opening formed on the second sidewall.

* * * * *